United States Patent
Gemkow

(10) Patent No.: US 11,173,955 B2
(45) Date of Patent: Nov. 16, 2021

(54) WHEEL SUPPORT APPARATUS

(71) Applicant: Jaguar Land Rover Limited, Coventry (GB)

(72) Inventor: Karla Simone Gemkow, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/569,968

(22) Filed: Sep. 13, 2019

(65) Prior Publication Data

US 2020/0086916 A1    Mar. 19, 2020

(30) Foreign Application Priority Data

Sep. 13, 2018  (GB) ...................................... 1814899

(51) Int. Cl.
*B62D 7/18*    (2006.01)

(52) U.S. Cl.
CPC ............ *B62D 7/18* (2013.01); *B60G 2206/50* (2013.01)

(58) Field of Classification Search
CPC .............................. B60G 2206/50; B62D 7/18
See application file for complete search history.

(56) References Cited

U.S. PATENT DOCUMENTS

| 2015/0102592 A1* | 4/2015 | Kerstan ................ B62D 21/152 |
| | | 280/784 |
| 2016/0176441 A1* | 6/2016 | Averdiek ............... B62D 21/00 |
| | | 280/86.751 |

FOREIGN PATENT DOCUMENTS

| DE | 10 2015 112 509 A1 | 2/2017 | |
| DE | 102015112509 A1 * | 2/2017 | ............ B60G 7/008 |
| JP | 2005178543 A * | 7/2005 | |
| JP | 2015-113052 A | 6/2015 | |
| KR | 10-2007-0100465 A | 10/2007 | |

OTHER PUBLICATIONS

Patents Act 1977: Combined Search and Examination Report under Sections 17 and 18(3), UKIPO Application No. GB1814899.9, dated Jan. 31, 2019, 7 pp.

* cited by examiner

*Primary Examiner* — Paul N Dickson
*Assistant Examiner* — Scott F. Underwood
(74) *Attorney, Agent, or Firm* — Carlson, Gaskey & Olds

(57) ABSTRACT

A wheel knuckle for supporting a wheel of a vehicle includes an upper member for connection to a vehicle suspension system, and a hub for supporting a bearing assembly. A displacement control member is provided for promoting displacement of the upper member towards a front of the vehicle in the event of a frontal collision. The displacement control member comprises a distal end for positioning proximal to a rim of the wheel. The distal end of the control member is disposed at a vertical height which is lower than a rotational axis of the wheel.

11 Claims, 8 Drawing Sheets

FIG. 3

WHEEL SUPPORT APPARATUS

CROSS-REFERENCE TO RELATED APPLICATION

This application claims priority under 35 U.S.C. § 119 to Great Britain Application No. 1814899.9, filed Sep. 13, 2018, the content of which is incorporated herein by reference in its entirety.

TECHNICAL FIELD

The present disclosure relates to a wheel support apparatus. The wheel support apparatus is configured to provide support for the wheel in the event of a collision. In particular, but not exclusively, the present disclosure relates to a wheel knuckle for supporting a wheel of a vehicle. The present disclosure also relates to a hub assembly; and to a vehicle.

BACKGROUND

There is an ongoing desire to improve vehicle safety. This is reflected in the continuing development of crash structures provided in vehicles to dissipate collision energy. In the event of a collision, the crash structures may absorb some of the collision energy, for example as they undergo deformation. The crash structures may perform the additional function of transmitting the collision energy through the vehicle structure for dissipation. The displacement (trajectory) of the wheels during a collision may be a factor in the dissipation of energy from the collision, particularly if the frontal collision includes a small lateral overlap. At least in certain embodiments, the present invention seeks to provide an improved crash structure.

SUMMARY OF THE INVENTION

Aspects of the present invention relate to a wheel knuckle, to a hub assembly and to a vehicle incorporating a wheel knuckle.

According to a further aspect of the present invention there is provided a wheel knuckle for supporting a wheel of a vehicle, the wheel knuckle comprising:
an upper member for connection to a vehicle suspension system;
a hub for supporting a bearing assembly; and
a displacement control member configured such that in use the displacement control member extends at least substantially parallel to a longitudinal axis of the vehicle; to establish an additional load path for a collision energy to promote displacement of the upper member towards a front of the vehicle, and to reduce rotation of the wheel around its vertical axis in the event of a frontal collision;
wherein the displacement control member comprises a distal end configured such that in use it is proximal to a rim of the wheel, the distal end of the control member configured such that in use it is disposed at a vertical height which is lower than a rotational axis of the wheel. In the event of a frontal collision, it has been determined that removing the wheel and associated suspension components as soon as possible after the collision, has a positive effect on the structural performance. This may, for example, be desirable for a frontal collision in which there is a small overlap strategy, whereby the vehicle collides with a barrier or obstacle spanning only a portion of the front of the vehicle.

The distal end of the displacement control member is configured such that in use it is disposed at a vertical height below that of the wheel axis so as to provide a counter moment to the knuckle during a frontal collision. In the event of a frontal collision, the displacement control member promotes rotation of the wheel knuckle such that the upper member is rotated towards the front of the vehicle. At least in certain embodiments, this configuration may cause the upper member to rotate towards the front of the vehicle, thereby allowing the wheel and knuckle assembly to be ejected outside of the vehicle envelope as they translate rearwards during the collision. The displacement control member may promote displacement of the wheel in a predominantly linear trajectory, and may reduce rotation around its vertical axis. In use, the displacement control member may control rotational movement of the wheel knuckle. At least in certain embodiments, the displacement control member may promote rotational displacement of the upper member towards the front of the vehicle.

In the event of a frontal collision, the displacement control member may transmit collision loads into the wheel knuckle, particularly as the wheel rim collapses. The distal end of the displacement control member may be configured such that in use it is positioned proximal to the inner wall of the wheel rim.

The displacement control member may be an extension of the wheel knuckle. The wheel knuckle may be for a front or rear axle of the vehicle.

At least a portion of the displacement control member may be configured configured such that in use to be inclined downwardly towards the front of the vehicle. The displacement control member may have a substantially linear form which is configured such that in use it is inclined downwardly. The displacement control member may extend in a radial direction.

The displacement control member may comprise a proximal portion and a distal portion. The proximal end may be connected to the centre hub of the wheel knuckle. The distal end of the displacement control member may be configured such that in use it is inclined downwardly or offset vertically from the proximal portion.

The displacement control member may be configured such that in use it is disposed at a vertical height which is lower than that of a rotational axis of the wheel or below a horizontal wheel centreline. The displacement control member may extend from a location on the centre hub which is lower than the wheel rotational axis. The proximal end of the displacement control member may be connected to the hub at a vertical height below the rotational axis of the wheel.

The proximal portion of the displacement control member may extend substantially parallel to the longitudinal axis of the vehicle. The distal end of the displacement control member may be inclined downwardly or offset vertically from the proximal portion.

The wheel knuckle may comprise a track rod arm. The displacement control member may be an extension of the track rod arm. The displacement control member may extend downwardly from the track rod arm.

The distal end of the displacement control member may be suitable for engaging an inner wall of the rim of the wheel. The distal end of the displacement control member may comprise an engagement surface for engaging the rim of the wheel.

The displacement control member may comprise a head portion which, in use, is disposed proximal to the rim of the wheel. The head portion may have an enlarged cross section.

The distal end of the displacement control member may have a front surface comprising an arcuate surface configured such that in use it may be centred on the wheel rotational axis.

The displacement control member may be formed integrally with the wheel knuckle. For example, the displacement control member may be formed integrally with the track rod arm.

Alternatively, the displacement control member may be formed as a separate component which is fastened to the wheel knuckle, for example using one or more mechanical fastener.

According to a further aspect of the present invention there is provided a hub assembly comprising a wheel knuckle as described herein.

According to a further aspect of the present invention there is provided a vehicle comprising at least one wheel knuckle as described herein.

The at least one wheel knuckle may be associated with a front axle of the vehicle.

Aspects of the present invention have been described with reference to the vertical height of the distal end of the displacement control member relative to the rotational axis of the associated wheel. The relative height assumes normal operating conditions, for example when the vehicle is disposed on a horizontal surface such that a longitudinal axis of the vehicle is substantially horizontal.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIG. 3 is a plan view of a displacement control member of the wheel knuckle shown in FIG. 2;

DETAILED DESCRIPTION

A vehicle 1 having a plurality of wheel mounting assemblies 2-$n$ in accordance with an embodiment of the present invention will now be described with reference to the accompanying figures.

Figure 1:
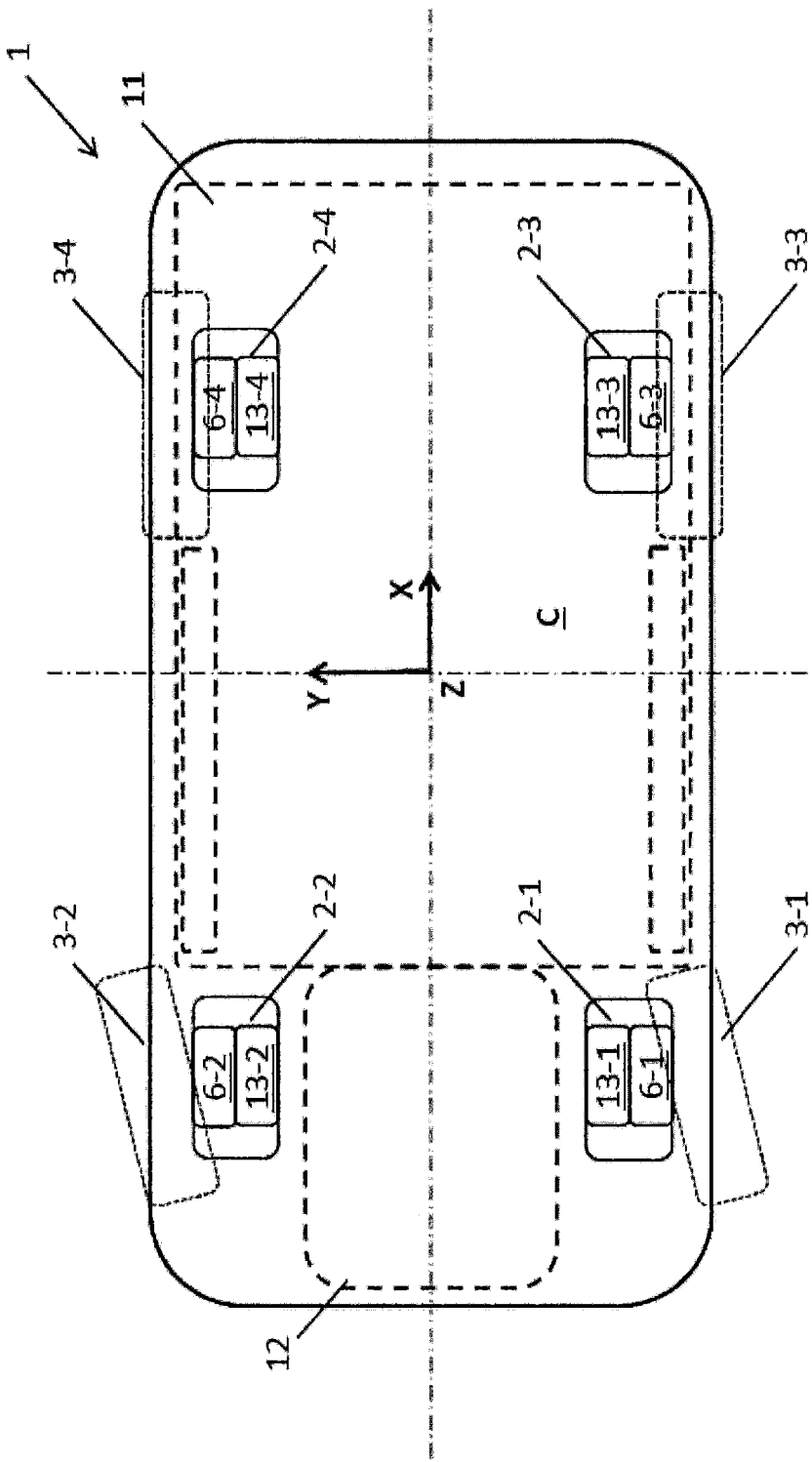
FIG. 1 shows a schematic representation of a vehicle comprising wheel mounting assemblies in accordance with an embodiment of the present invention.

The vehicle 1 in the present embodiment is a motor vehicle, such as an automobile, as illustrated in FIG. 1. The vehicle 1 is illustrated as a sports utility vehicle (SUV) but aspects of the invention described herein may be implemented in other types of automobile and, indeed, other types of vehicle. The vehicle 1 is described herein with reference to a frame comprising a longitudinal axis X, a transverse axis Y and a vertical axis Z. The references herein to the left and right sides of the vehicle 1 are in relation to the vehicle 1 when viewed along the longitudinal axis X from behind the rear of the vehicle 1.

The vehicle 1 comprises an internal combustion engine (not shown), but aspects of the invention could be implemented in a vehicle 1 comprising one or more electric traction motor, for example an electric vehicle (EV) or a hybrid electric vehicle (HEV). As shown in FIG. 1, the vehicle 1 comprises four wheels 3-$n$ (the suffix "n" being used herein to identify relative location on the vehicle 1). The vehicle 1 has a left front wheel 3-1, a right front wheel 3-2, a left rear wheel 3-3 and a right rear wheel 3-4. The vehicle 1 is a four-wheel drive and, in use, torque is output to each of the wheels 3-$n$. The vehicle 1 may have permanent four-wheel drive, or a decoupling mechanism may be provided selectively to engage/disengage the four-wheel drive. It will be understood that aspects of the invention described herein may be implemented in a two-wheel drive vehicle having either a front-wheel drive or a rear-wheel drive configuration.

Figure 2:
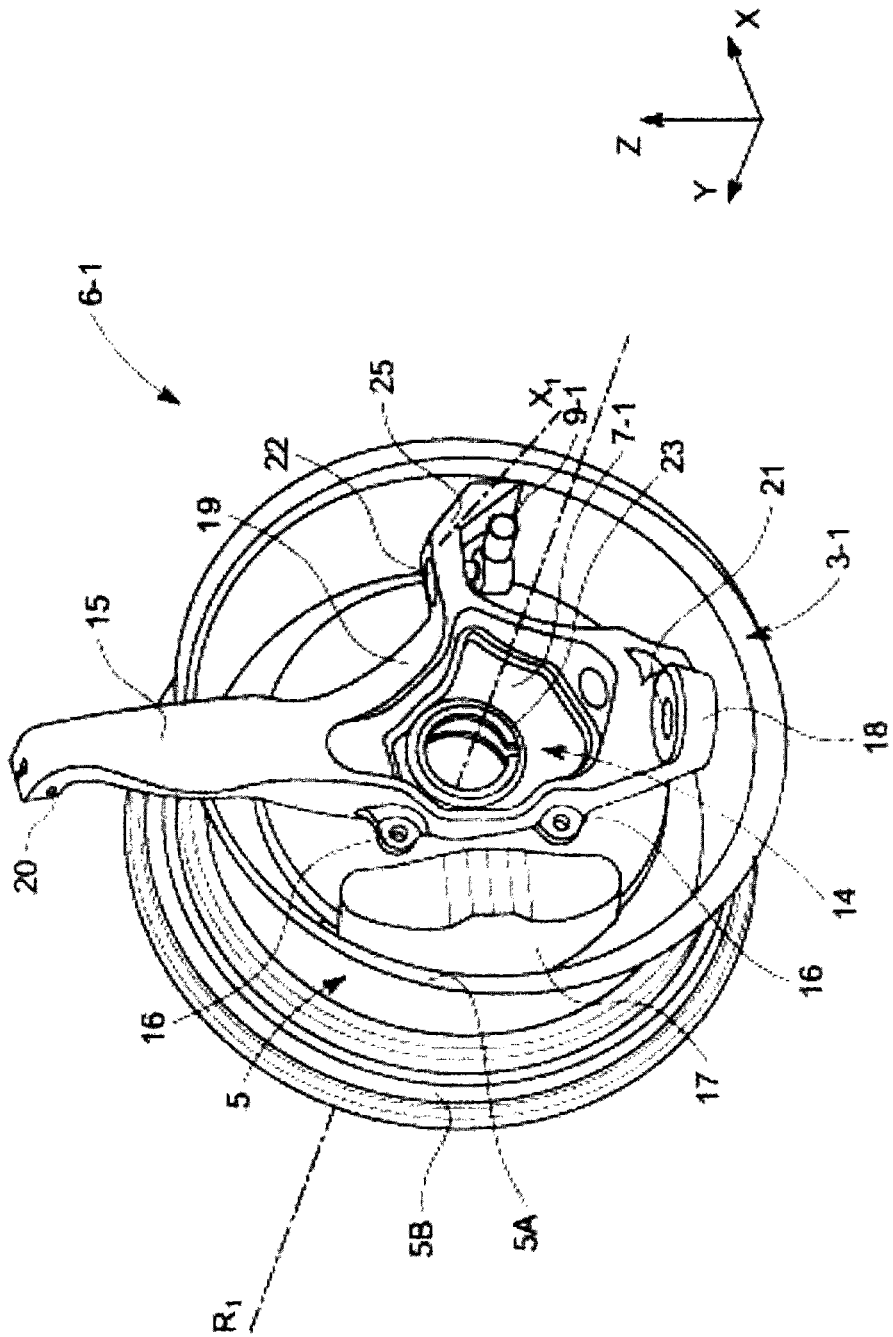
FIG. 2 is a perspective view of a wheel knuckle and a wheel of the wheel mounting assembly shown in FIG. 1.

The wheels 3-$n$ are of conventional design, as shown in FIG. 2. Each wheel 3-$n$ comprises a wheel disc 10 (not shown in FIG. 2) and a wheel rim 5 for supporting a tyre (not shown). The wheel disc 10 may, for example, comprise a plurality of radial spokes. The wheel rim 5 comprises an inboard portion 5A and an outboard portion 5B. The wheel disc 10 is connected to the outboard portion 5B of the wheel rim 5 and connects the wheel rim 5 to a bearing assembly for mounting the wheel 3-$n$. The wheel 3-$n$ is rotatable about a rotational axis $R_n$, as shown in FIG. 2. The rotational axis $R_n$ is disposed on a horizontal wheel centre line CL (shown in FIG. 4).

The wheel mounting assemblies 2-$n$ mount the wheels 3-$n$ to the vehicle 1. Each mounting assembly 2-$n$ comprises a hub assembly 6-$n$ having a wheel knuckle 7-$n$ (also known as an axle carrier) and an axle hub 8-$n$. The left and right front wheels 3-1, 3-2 are mounted to left and right front hub assemblies 6-1, 6-2 respectively; and the left and right rear wheels 3-3, 3-4 are mounted to left and right rear hub assemblies 6-3, 6-4 respectively. The left and right front hub assemblies 6-1, 6-2 are steering hub assemblies which are mounted in a swiveling arrangement to enable the direction of the left and right front wheels 3-1, 3-2 to be controlled to steer the vehicle 1. As described herein, the left and right front wheel knuckles 7-1, 7-2 are connected to left and right track rods 9-1 (only the left track rod 9-1 is shown in the Figures) to provide steering inputs. The axle hubs 8-$n$ each comprise a wheel bearing (not shown) which defines the rotational axis $R_n$ about which the associated wheel 3-$n$ rotates. The axle hubs 8-$n$ are of conventional design and each comprise a plurality of mechanical fasteners for fastening a wheel disc 10 and the associated wheel 3-$n$.

As shown in FIG. 1, the vehicle 1 comprises a chassis 11 having a front subframe 12 for mounting the engine. The left and right front hub assemblies 6-1, 6-2 are mounted on respective sides of the front subframe 12. The vehicle 1 comprises suspension units 13-n to control vertical movement of the hub assemblies 6-n. Left and right front suspension units 13-1, 13-2 control vertical movement of the left and right front hub assemblies 6-1, 6-2. The left and right front suspension units 13-1, 13-2 each comprise a front strut assembly (not shown) which is connected to the left and right front wheel knuckles 7-1, 7-2. Left and right rear suspension units 13-3, 13-4 control vertical movement of the left and right rear hub assemblies 6-3, 6-4.

The left and right front suspension units 13-1, 13-2 may have the same configuration as the left and right rear suspension units 13-3, 13-4, or a different configuration. The configuration of the left front hub assembly 6-1, which mounts the left front wheel 3-1, will now be described in more detail. It will be understood that the right front hub assembly 6-2 has substantially the same configuration. The left front hub assembly 6-1 comprises the left front wheel knuckle 7-1 and the left front axle hub 8-1. The left front wheel knuckle 7-1 is a forged component having a unitary (one-piece) construction. The left front wheel knuckle 7-1 may be composed of a metal, such as steel or aluminium, or a metal alloy. As shown in FIG. 2, the left front wheel knuckle 7-1 comprises a centre hub 14 for mounting a wheel bearing assembly (not shown); an upper arm 15 for connection to the first front suspension unit 13-1; first and second lateral bosses 16 for mounting a brake caliper 17; a bottom bracket 18 for mounting the left front wheel knuckle 7-1; and a track rod arm 19 for connection to the left track rod 9-1. The upper arm 15 comprises at least one transverse bore 20 for receiving a bolt to connect the left front wheel knuckle 7-1 to the front strut assembly. The first and second lateral bosses are disposed at the rear of the left front wheel knuckle 7-1 to mount the brake caliper 17 in an aft position. A vertical bore 21 is formed in the bottom bracket 18 to mount the left front wheel knuckle 7-1 to a control arm (not shown) pivotally connected to the front subframe 12. A bushing (not shown) is provided in the vertical bore 21 to mount the left front wheel knuckle 7-1 in a swiveling arrangement.

The track rod arm 19 is disposed at the front of the left front wheel knuckle 7-1. In the present embodiment the track rod arm 19 extends in a substantially radial direction from the rotational axis $R_1$ of the left front wheel 3-1. The track rod arm 19 is substantially parallel to the longitudinal axis X of the vehicle 1 when the left front hub assembly 6-1 is installed. The track rod arm 19 comprises a joint 22 for connecting an outboard end of the left track rod 9-1 to the left front wheel knuckle 7-1. The joint 22 in the present embodiment comprises a ball joint, but other joints are contemplated. In the present embodiment, the brake caliper 17 and the track rod arm 19 are diametrically opposed from each other. It will be appreciated that the position of the brake caliper 17 and/or the track rod arm 19 may vary. A centre bore 23 is formed in the centre hub 14 of the left front wheel knuckle 7-1 for mounting the left front axle hub 8-1. The left front axle hub 8-1 comprises a bearing to enable rotation of the left front wheel 3-1. A front stub axle (not shown) extends through the centre bore 23 to transmit torque to the left front wheel 3-1.

The left front hub assembly 6-1 comprises a first displacement control means for controlling displacement of the wheel rim 5 of the left front wheel 3-1 in the event of a frontal collision. The right front hub assembly 6-2 comprises a second displacement control means for controlling displacement of the wheel rim 5 of the right front wheel 3-2 in the event of a frontal collision. The first and second displacement control means have substantially the same configuration. As described herein, the first displacement control means is configured to promote displacement of the upper arm 15 towards a front of the vehicle 1 in the event of a frontal collision. The configuration of the first displacement control means associated with the left front hub assembly 6-1 will now be described in more detail.

The first displacement control means comprises a first displacement control member 24-1. The first displacement control member 24-1 is incorporated into the left front wheel knuckle 7-1. In the present embodiment, the first displacement control member 24-1 comprises an elongate projection 25 which is an extension of the track rod arm 19. The elongate projection 25 (highlighted by hashed shading in FIG. 3 for illustration purposes) is formed integrally with the track rod arm 19 and extends beyond the joint 22 connecting the left track rod 9-1 to the track rod arm 19. In a modified arrangement, the elongate projection 25 could be formed as a separate component which is then fastened to the left front wheel knuckle 7-1. The elongate projection 25 extends towards a front of the vehicle 1. When the left front wheel 3-1 is in a straight-ahead position (i.e. the steering angle is zero degrees), the central longitudinal axis $X_1$ of the elongate projection 25 extends in a plane disposed substantially parallel to the longitudinal axis X of the vehicle 1. The elongate projection 25 is aligned with the inboard portion A of the wheel rim 5 and is spaced apart from the wheel disc 10 in a transverse direction.

Figure 3:
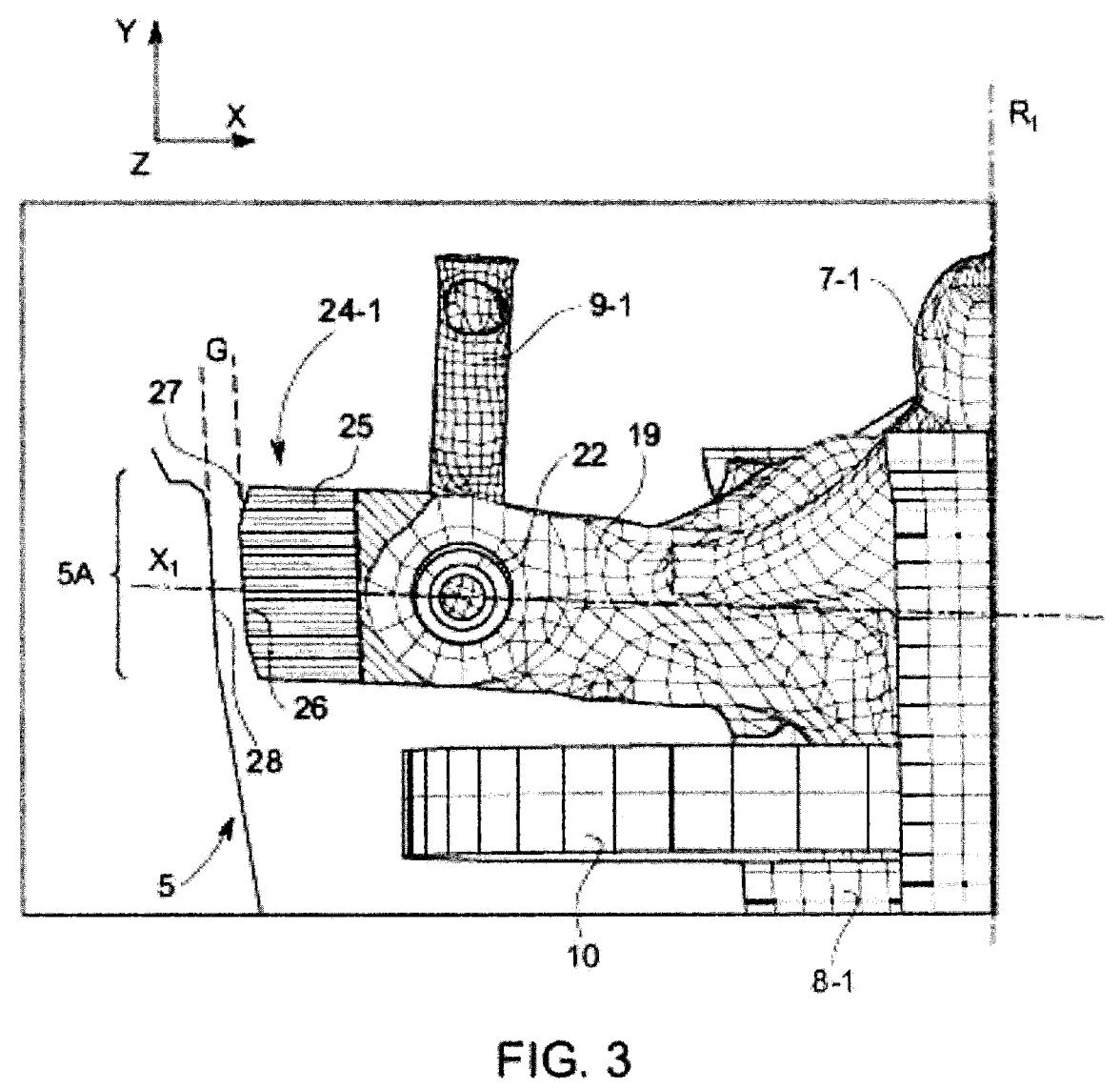
Figure 4:
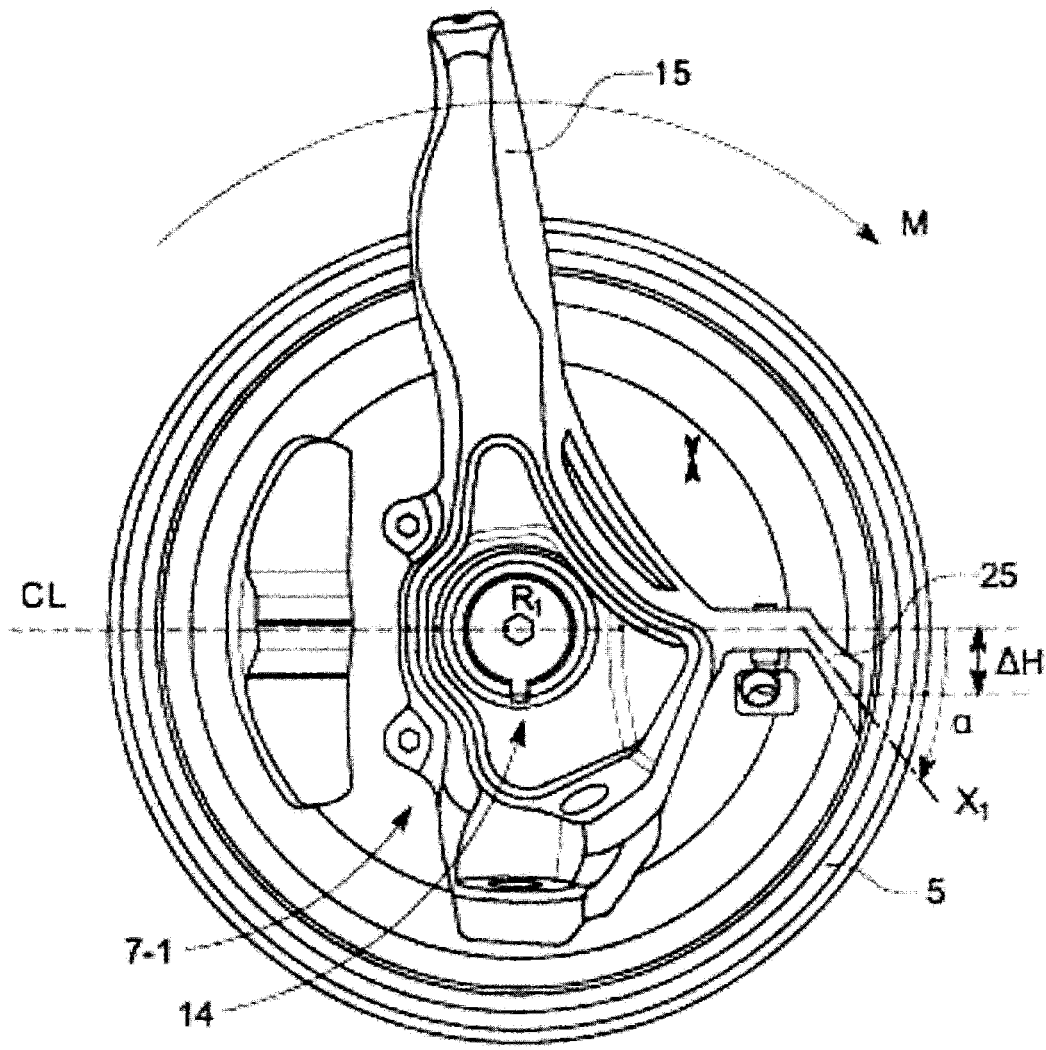
FIG. 4 is a side elevation of the displacement control member of the wheel knuckle shown in FIG. 2.

As shown in FIGS. 2 and 4, the central longitudinal axis $X_1$ of elongate projection 25 is inclined downwardly towards the front of the vehicle 1. An acute incline angle α is formed between the central longitudinal axis $X_1$ and the longitudinal axis X of the vehicle 1. The incline angle α in the present embodiments is approximately 45°. As shown in FIGS. 2 to 4, the elongate projection 25 has a distal end 26. The distal end 26 is disposed at a vertical height which is lower than the rotational axis $R_1$ of the left front wheel 3-1 (i.e. below the horizontal centre line of the left front wheel 3-1). Thus, when the vehicle 1 is on a horizontal surface, the distal end 26 is positioned below the rotational axis $R_1$ of the left front wheel 3-1. In the illustrated arrangement, the distal end 26 is disposed at a vertical offset ΔH below the horizontal wheel centreline CL of the left front wheel 3-1. In the event of a frontal collision resulting in the deformation of the wheel rim 5, the distal end 26 engages an inner surface of the wheel rim 5 as it deforms. The distal end 26 thereby forms a rim-engaging surface for engaging an inner surface of the wheel rim 5 in the event of a frontal collision. Since the distal end 26 is disposed below the rotational axis $R_1$ of the left front wheel 3-1, a turning moment is generated which rotates the front left wheel knuckle 7-1 about the rotational axis $R_1$. In particular, the turning moment M (illustrated in FIG. 4) promotes rotation of the front left wheel knuckle 7-1 such that the upper arm 15 rotates towards the front of the vehicle 1. The rotation of the front left wheel knuckle 7-1 may displace the upper arm 15 away from an occupant compartment C of the vehicle 1. This rotational movement of the upper arm 15 may reduce the likelihood of the front left wheel knuckle 7-1 becoming trapped in the body structure and, at least in certain embodiments, may facilitate an outwards motion of the wheel 3-1 and suspension components.

The distal end 26 of the elongate projection 25 has a radially outer surface 27 which is disposed proximal to a radially inner surface 28 of the wheel rim 5. The radially outer surface 27 is spaced apart from the radially inner surface 28 such that a radial gap G is maintained between the wheel rim 5 and the first displacement control member 24-1. By forming the radial gap G between the wheel rim 5 and the first displacement control member 24-1, the elongate projection 25 does not support the wheel rim 5 during normal use. However, in the event of a collision which causes the wheel rim 5 to deform, the elongate projection 25 is configured to engage the wheel rim 5 as it deforms. The elongate projection 25 thereafter supports the wheel rim 5 and helps to control subsequent deformation, for example by reducing localised deformation. As shown in FIG. 3, the radially outer surface 27 of the elongate projection 25 is profiled at least substantially to match the profile of the radially inner surface 28 of the wheel rim 5. In a variant, the radially outer surface 27 of the elongate projection 25 may be part-cylindrical and define a circular arc which is concentric with the rotational axis $R_1$ of left front wheel 3-1. Thus, the radial gap G is substantially uniform in a circumferential direction. It will be understood that the right front wheel knuckle 7-2 has substantially the same configuration as the left front wheel knuckle 7-1.

Figure 5:
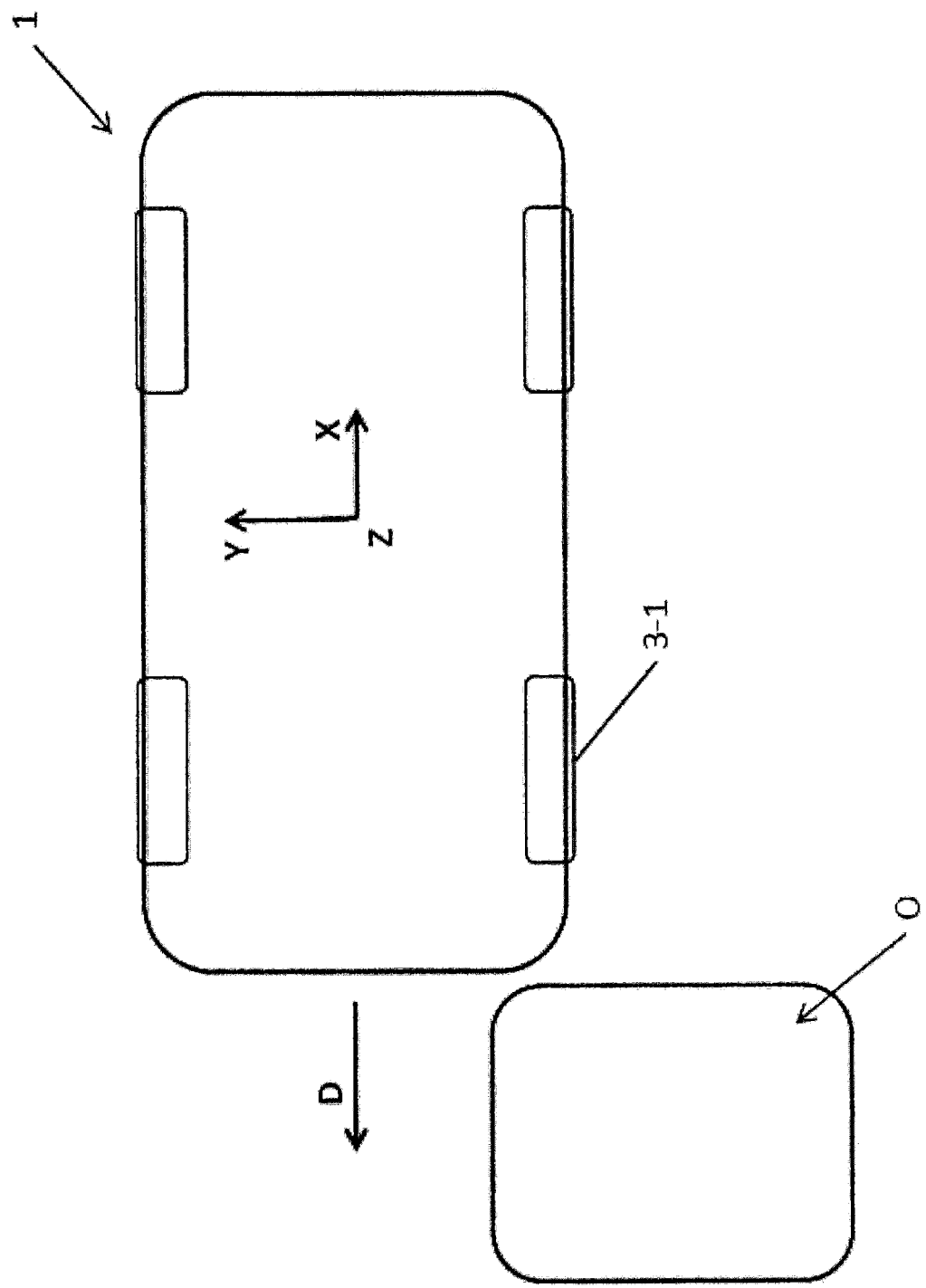
FIG. 5 is a schematic representation of the vehicle in a frontal collision with a rigid obstacle.

The operation of the first displacement control member 24-1 in the event of a frontal collision with an obstacle O having a small lateral overlap on the left hand side of the vehicle 1 will now be described with reference to FIGS. 5, 6 and 7. It will be understood that the right front wheel knuckle 7-2 and the right front wheel 3-2 behave in a similar manner.

The obstacle O is in the form of a rigid barrier. The vehicle 1 travelling in a straight line coincident with the longitudinal axis X, as illustrated by an arrow D in FIG. 5. The energy transmitted during the collision (referred to herein as the "collision energy") is transmitted through the left hand side of the vehicle 1, for example through a front bumper and a left wing, and into the left front wheel 3-1. For the purposes of describing the function of the first displacement control member 24-1, the collision energy is sufficient to deform the left front wheel 3-1 and also to displace the left front wheel 3-1. In a prior art arrangement, the collision energy is transmitted to the front wheel knuckle through the wheel disc 10. In accordance with an aspect of the present invention, the wheel rim 5 of the impacted wheel is deformed and the first displacement control member 24-1 is engaged by the deformed wheel rim 5. Specifically, the radially inner surface 28 of the wheel rim 5 is displaced in a rearwards direction, closing the radial gap G and engaging the radially outer surface 27 of the elongate projection 25. The elongate projection 25 establishes an additional load path for the collision energy. The collision energy may be transmitted to the left front wheel knuckle 7-1 through the wheel disc 10 and the elongate projection 25. The distal end 26 of the elongate projection 25 is disposed below the rotational axis $R_1$ of the left front wheel 3-1 and a turning moment is generated about the rotational axis $R_1$. The turning moment causes the front left wheel knuckle 7-1 to rotate about the rotational axis $R_1$, thereby displacing the upper arm 15 towards the front of the vehicle 1. The rotation of the front left wheel knuckle 7-1 may displace the upper arm 15 clear of the occupant compartment C.

The first displacement control member 24-1 may help to control the subsequent deformation of the wheel rim 5, for example by reducing deformation of the inboard portion A of the wheel rim 5. The first deformation control member 24-1 may also control the resulting trajectory (displacement) of the left front wheel 3-1 as it is displaced by the collision energy. The elongate projection 25 may reduce turning or rotation of the left front wheel 3-1 during the collision. This can alter the trajectory of the left front wheel 3-1 during the collision such that the left front wheel 3-1 is displaced in a longitudinal direction with reduced rotation compared to the prior art arrangements. This is particularly advantageous since the left front wheel 3-1 is more likely to engage structural components in the chassis 11 for absorbing collision energy.

Figure 6:
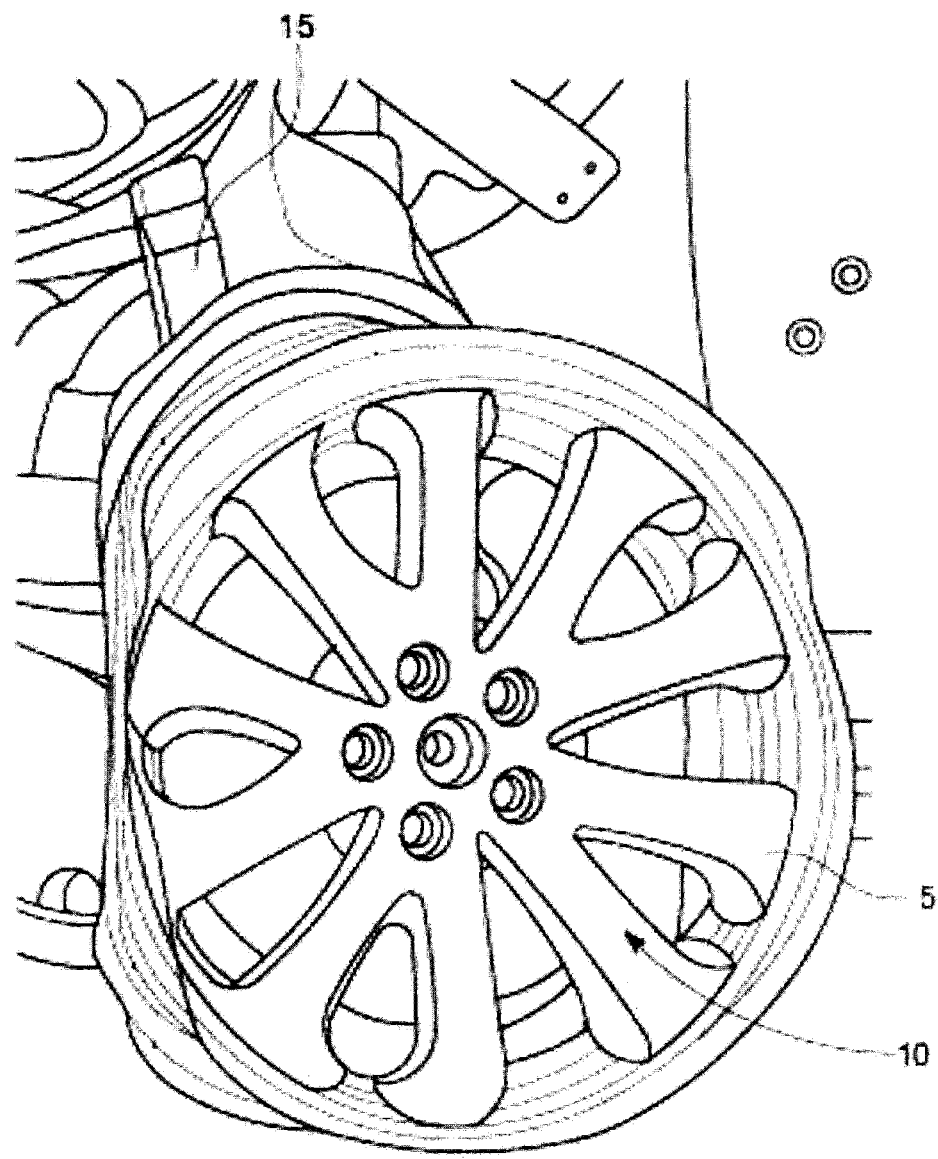
FIG. 6 is a simulation of the displacement of the front left wheel in the frontal collision illustrated in FIG. 5 for a wheel knuckle with a displacement control member.
Figure 7:
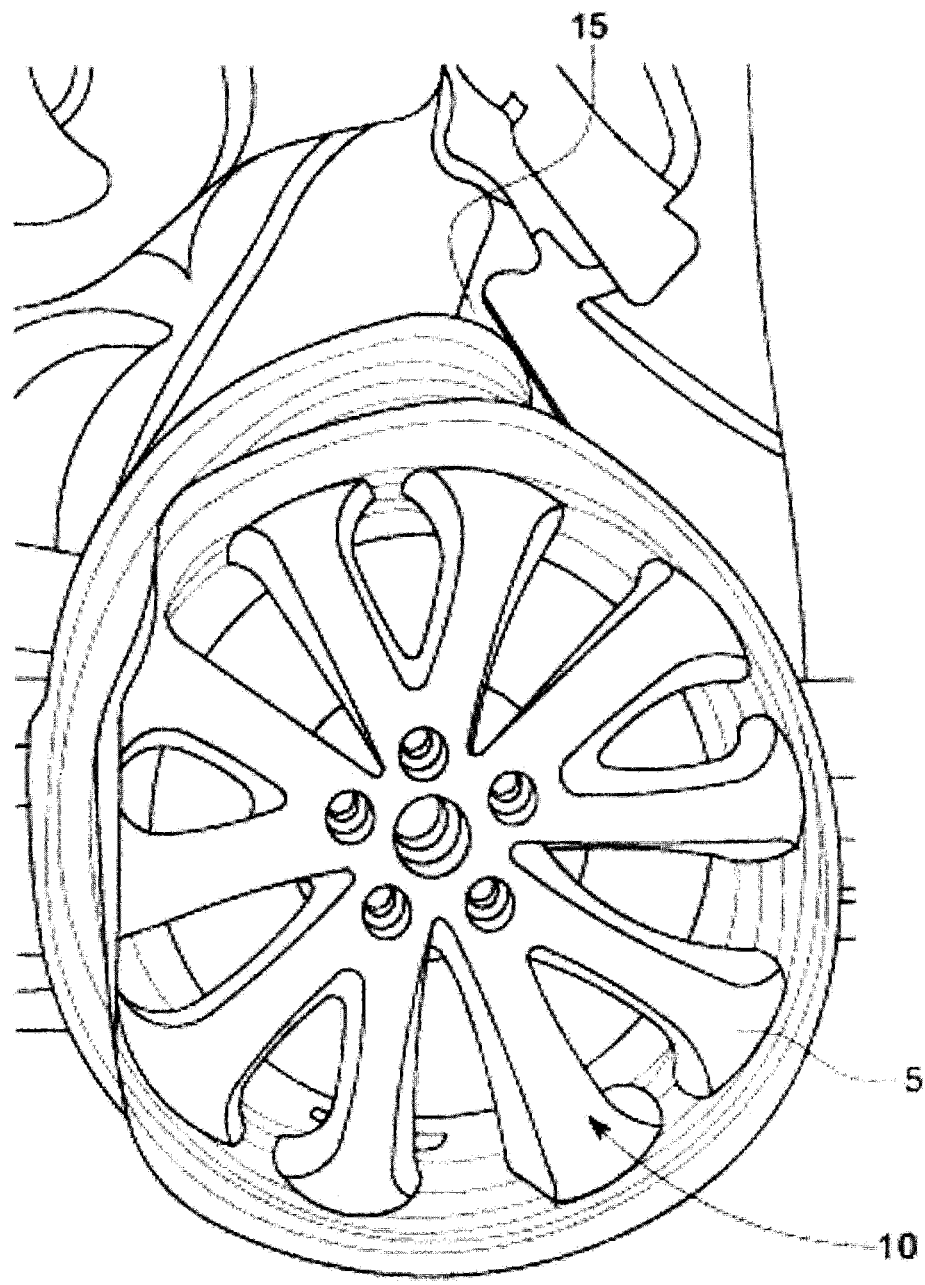
FIG. 7 is a simulation of the displacement of the front left wheel in the frontal collision illustrated in FIG. 5 for a wheel knuckle without a displacement control member.

A simulation of the collision is illustrated in FIG. 6. The first displacement control member 24-1 may help to control the trajectory of the left front wheel 3-1 during the collision. The forwards displacement of the upper arm 15 reduces the likelihood of the front left wheel knuckle 7-1 becoming trapped in the body structure. The left front wheel 3-1 (along with the front left wheel knuckle 7-1 and associated components of the suspension) may be displaced laterally outwardly, away from the occupant compartment C. At least in certain embodiments, the first displacement control member 24-1 may promote ejection of the left front wheel 3-1 and the front left wheel knuckle 7-1 in the event of a collision. By way of comparison, a simulation of a collision is shown in FIG. 7 for a wheel knuckle 7-1 which does not incorporate the first displacement control member 24-1 described herein. In this simulation, the upper arm 15 is displaced rearwardly and becomes trapped in the body structure which inhibits or restricts ejection of the wheel rim 5 in a lateral direction. Thus, as shown in FIG. 7, the wheel rim 5 is retained proximal to the body of the vehicle 1.

It will be appreciated that various modifications may be made to the embodiment(s) described herein without departing from the scope of the appended claims. The elongate projection 25 in the present embodiment has a substantially uniform cross section along its longitudinal axis. It will be appreciated that the profile of the elongate projection 25 may be modified. The cross section of the elongate projection 25 may increase in a radially outwards direction to provide support for the wheel rim 5 over a larger region. For example, the elongate projection 25 may comprise a radially outer head portion for positioning proximal to the radially inner surface of the wheel rim 5. The head portion may be extended in at least one circumferential direction.

Figure 8:
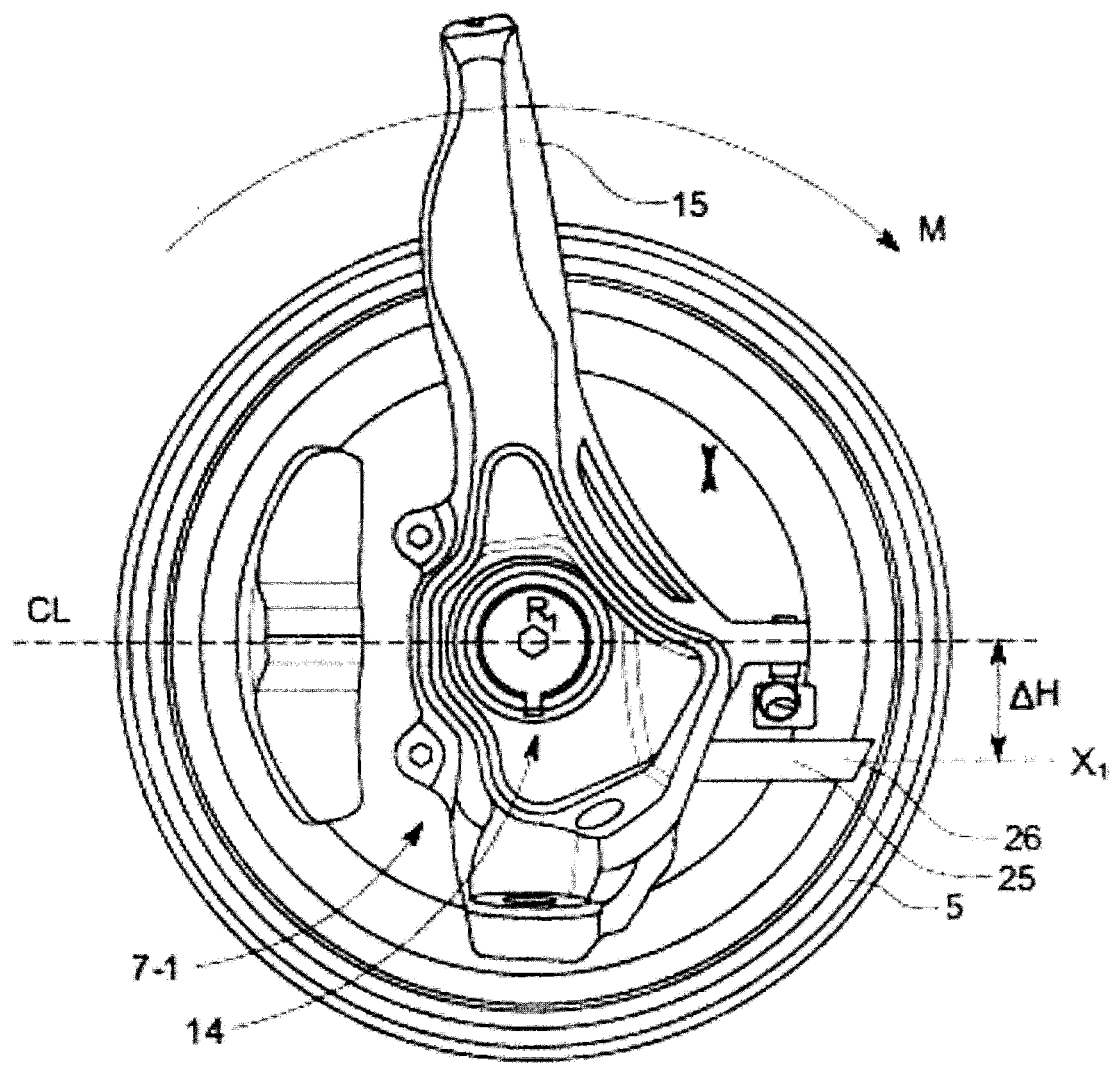
FIG. 8 is a side elevation of a wheel knuckle in accordance with a further embodiment of the present invention.

A variant of the embodiment described herein with reference to FIGS. 1 to 7 is shown in FIG. 8. Like reference numerals are used for like component. The central longitudinal axis $X_1$ of the elongate projection 25 is extends substantially parallel to the longitudinal axis X of the vehicle 1. The elongate projection 25 extends from the centre hub 14 of the wheel knuckle 7-1. The elongate projection 25 in this variant is disposed at a vertical height which is lower than the rotational axis $R_1$ of the left front wheel 3-1 (i.e. below the horizontal centre line of the left front wheel 3-1). Thus, when the vehicle 1 is on a horizontal surface, the distal end 26 is positioned below the rotational axis $R_1$ of the left front wheel 3-1. In the illustrated arrangement, the central longitudinal axis $X_1$ is disposed at a vertical offset ΔH below the horizontal wheel centreline CL of the left front wheel 3-1. In the event of a frontal collision resulting in the displacement of the wheel rim 5, the distal end 26 engages an inner surface of the wheel rim 5 as it deforms. Since the distal end 26 is disposed below the rotational axis $R_1$ of the left front wheel 3-1, a turning moment is generated which rotates the front left wheel knuckle 7-1 about the rotational axis $R_1$. The turning moment M promotes rotation of the front left wheel knuckle 7-1 such that the upper arm 15 rotates towards the front of the vehicle 1, thereby displacing the upper arm 15 away from the occupant compartment C of the vehicle 1.

In the embodiments described herein the elongate projection 25 comprises an extension of the track rod arm 19. In alternate embodiments, the elongate projection 25 may be formed separately from the track rod arm 19. This arrangement may be appropriate if the track rod arm 19 is formed in an upper region of the wheel knuckle.

The first and second displacement control members 24-1, 24-2 have been described with particular reference to the left and right front wheels 3-1, 3-2 of the vehicle 1. It will be understood that the invention may be implemented in the left and right rear wheels 3-3, 3-4. In particular, first and second displacement control means may be incorporated into the rear wheel hub assemblies. For example, the left and right rear wheel knuckles may each comprise a support member arranged to support the wheel rim 5 of the associated rear wheel.

In a further embodiment, the displacement control means may be mounted to the track rod. For example, the displacement control means may be mounted to the track rod at the joint provided in the track rod arm. The displacement control means may comprise a displacement control member, for example having a C-shaped section for mounting to the track rod arm. In use, a distal end of the displacement control member would locate proximal to the rim of the wheel. In accordance with an aspect of the present invention, the distal end of the control member would be disposed at a vertical height which is lower than a rotational axis of the wheel.

The invention claimed is:

1. A wheel knuckle for supporting a wheel of a vehicle, the wheel knuckle comprising:
   an upper member for connection to a vehicle suspension system;
   a hub for supporting a bearing assembly; and
   a displacement control member configured such that in use the displacement control member extends at least substantially parallel to a longitudinal axis of the vehicle so as to establish an additional load path for a collision energy to promote displacement of the upper member towards a front of the vehicle, and to reduce rotation of the wheel around a vertical axis of the wheel in the event of a frontal collision;
   wherein the displacement control member comprises a distal end configured such that in use the distal end of the control member is proximal to a rim of the wheel, the distal end of the control member configured such that in use the distal end of the control member is disposed at a vertical height which is lower than a rotational axis of the wheel.

2. The wheel knuckle as claimed in claim 1, wherein at least a portion of the displacement control member is configured such that in use the portion is inclined downwardly towards the front of the vehicle.

3. The wheel knuckle as claimed in claim 1, wherein the displacement control member extends from a location on the wheel knuckle which is configured such that in use the displacement control member is lower than the wheel rotational axis.

4. The wheel knuckle as claimed in claim 1, further comprising a track rod arm, wherein the displacement control member is an extension of the track rod arm.

5. The wheel knuckle as claimed in claim 4, wherein the displacement control member extends downwardly from the track rod arm.

6. The wheel knuckle as claimed in claim 1, wherein the distal end of the displacement control member is suitable for engaging an inner wall of the rim of the wheel.

7. The wheel knuckle as claimed in claim 1, wherein the displacement control member comprises a head portion which, in use, is disposed proximal to the rim of the wheel.

8. The wheel knuckle as claimed in claim 1, wherein the distal end of the displacement control member has a front surface comprising an arcuate surface configured such that in use the arcuate surface is centered on the wheel rotational axis.

9. A hub assembly comprising the wheel knuckle as claimed in claim 1.

10. A vehicle comprising the wheel knuckle as claimed in claim 1.

11. The vehicle as claimed in claim 10, wherein the wheel knuckle is associated with a front axle of the vehicle.

* * * * *